United States Patent
Shlomai et al.

(10) Patent No.: US 8,578,367 B2
(45) Date of Patent: Nov. 5, 2013

(54) METHOD FOR ENABLING THE INSTALLATION OF SOFTWARE APPLICATIONS ON LOCKED-DOWN COMPUTERS

(75) Inventors: Netzer Shlomai, Ra'anana (IL); Uzi Entin, Ra'anana (IL); Yoram Gabay, Stamford, CT (US)

(73) Assignee: WatchDox, Ltd., Petah Tikva (IL)

( * ) Notice: Subject to any disclaimer, the term of this patent is extended or adjusted under 35 U.S.C. 154(b) by 1074 days.

(21) Appl. No.: 12/548,900

(22) Filed: Aug. 27, 2009

(65) Prior Publication Data

US 2010/0070971 A1 Mar. 18, 2010

Related U.S. Application Data

(63) Continuation-in-part of application No. 12/419,030, filed on Apr. 6, 2009.

(60) Provisional application No. 61/097,073, filed on Sep. 15, 2008.

(51) Int. Cl.
*G06F 9/445* (2006.01)

(52) U.S. Cl.
USPC .......................................................... 717/174

(58) Field of Classification Search
USPC .................................................. 717/174–178
See application file for complete search history.

(56) References Cited

PUBLICATIONS

A Thinstall White Paper, "Deploying Applications to Locked Down Desktops", 2005, Thinstall, San Francisco, CA, 11 pages.*
Professional Forum, "System has been locked down/Need to install a program", Jun. 2004, http://www.tek-tips.com/viewthread.cfm?gid=861458, 3 pages.*

* cited by examiner

*Primary Examiner* — Ted T Vo
(74) *Attorney, Agent, or Firm* — Myers Wolin, LLC

(57) ABSTRACT

A method for enhancing functionality of locked-down computers by allowing installation of software applications on the locked-down computers operated by users having limited administrator permissions. The method comprises detecting an attempt for installation of a software application on a locked-down computer; generating a virtual software application corresponding to the software application, wherein the virtual software application is generated in a virtual environment; and enabling the execution of the virtual software application in the virtual environment.

16 Claims, 2 Drawing Sheets

METHOD FOR ENABLING THE INSTALLATION OF SOFTWARE APPLICATIONS ON LOCKED-DOWN COMPUTERS

CROSS-REFERENCE TO RELATED APPLICATIONS

This application claims the benefit of U.S. provisional application No. 61/097,073 filed on Sep. 15, 2008, the contents of which are herein incorporated by reference. This application is also a continuation-in-part of U.S. patent application Ser. No. 12/419,030 filed on Apr. 6, 2009, the contents of which are herein incorporated by reference.

TECHNICAL FIELD

This invention generally relates to the installation of software applications in a virtual environment.

BACKGROUND OF THE INVENTION

Personal computers (PCs) serve a multitude of software applications, features and functions. Applications provide users with means to accomplish productivity tasks, such as, but not limited to, document processing, spreadsheet management, email exchanges, and Internet browsing. The features and functions are commonly referred to as the "personalized information" and may comprise favorite Internet websites, contacts, Internet cookies, digital signatures, background images, desktop icons, application control bars, choice of default values and other configurable settings. In general, the personalized information differs from one user to another.

Typically, software applications are installed and setup using an automated installation process. The installation process is designed to enable the integration of the new functionality into the operating system, as well as ensuring that the application can be removed. Installation and setup of software applications can be typically performed by user accounts having administrative rights.

Modern operating systems, such as Microsoft® XP® or Microsoft Vista® typically include a registry file for storing operating system user and application settings and options, dynamic link libraries (DLLs) which contains shared code, and named objects for naming functions shared by different processes. This structure of an operating system causes most of the challenges associated with application installation, most notable of which are:

1. Operating system stability and performance: Installations permanently modify the operating system (even after uninstalling) resulting in an incremental decline in operating system performance due to uninstalled leftovers (orphan files), inflated registry files, and so on.
2. Conflicts: Installations cause application conflicts due to various incompatibilities and resource sharing issues.
3. Rigidness: Applications are installed into the operating system in a way that prevents the applications from being "detached" and migrated between different computers; applications are executed exclusively within the environment in which they were initially installed.
4. Security: When applications and the operating system are fused together, internal cross contamination is almost inevitable.
5. Mobility: once an application is installed onto the operating system it can be used only on the computer in which it was installed.

To secure a computing environment from performing harmful operations by applications or users, different permission levels are defined. Generally, there are two permission levels: guest and administrator. The guest permissions allow users only to run applications, but not to install applications or change applications' settings. The administrator permissions allow the user to install applications and hardware, make system-wide changes, access and read all non-private files, create and delete user accounts, define accounts' permissions, and so on.

One security approach that utilizes the permission system is known as "a locked-down computer", which is a computer that is being operated by a user account or process that does not have full administrator permissions. Locking down a computer limits the changes that can be made to the base operating system and prevents the installation of unauthorized software to the computer as well as blocking access of unwanted applications. This approach has been proven to be secured and at the same time reduces the total cost of ownership (TCO) of computers in the organization.

However, the challenge with locking-down a computer is the limitations it imposes on the users. In conventional desktop computing environments, a locked-down computer severely limits users from utilizing the entire set of features a software application. Such features include, for example, customization, add-ons, applying updates and intercommunication with other applications, and so on. This results in limited functionality and ultimately impacts the productivity of users. In addition, locking down computers requires a system administrator to maintain a central management of the applications installed on the organization's computers.

It would be, therefore, advantageous to provide a solution for locking down computers without imposing the limitations discussed above.

SUMMARY OF THE INVENTION

Certain embodiments of the invention include a method for enhancing functionality of locked-down computers by allowing installation of software applications on the locked-down computers operated by users having limited administrator permissions. The method comprises detecting an attempt for installation of a software application on a locked-down computer; generating a virtual software application corresponding to the software application, wherein the virtual software application is generated in a virtual environment; and enabling the execution of the virtual software application in the virtual environment.

Certain embodiments of the invention further include a system for enhancing functionality of locked-down computers by allowing installation of software applications on the locked-down computers operated by users having limited administrator permissions. The system comprises a monitor for at least detecting an attempt for installation of a software application on a locked-down computer; an Encapsulator for generating a virtual software application corresponding to the software application, wherein the virtual software application is generated in a virtual environment; and a bridge agent for enabling the execution of the virtual software application in the virtual environment.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be

DETAILED DESCRIPTION OF THE INVENTION

Figure 1:
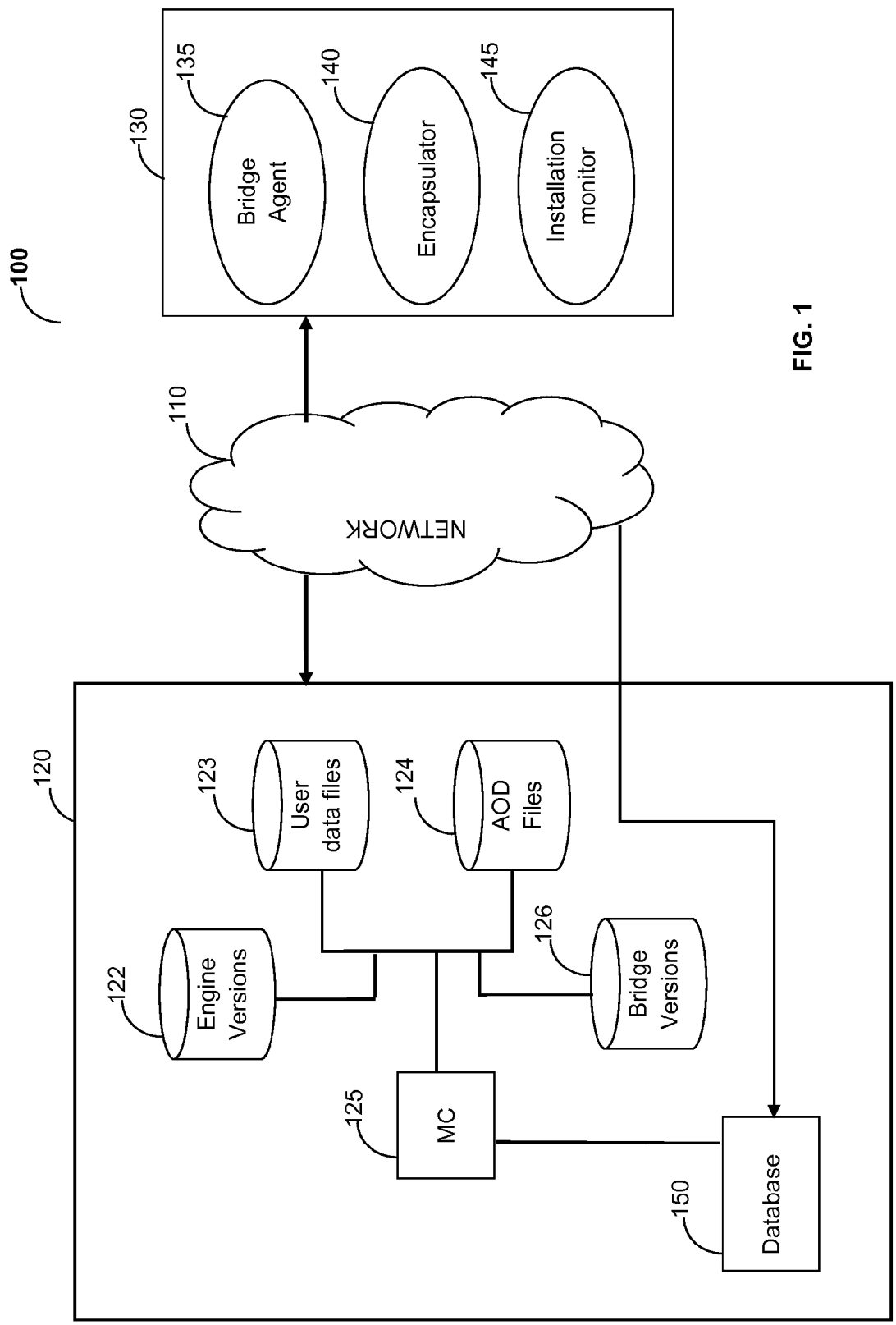
FIG. 1 is a diagram of a virtualized environment enabling the installation and execution of applications on locked down computers implemented in accordance with an embodiment of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a diagram illustrating a computer network system 100 useful in describing the principles of the invention. Without limiting the scope of the invention the system 100 is a simplified structure of a computer system deployed in an organization where only a single file server 120 is connected through a network 110 to a single personal computer (PC) 130. It is appreciated that such systems typically include one or more file servers and a plurality of PCs of users in the organization.

The network 110 may be, but is not limited to, a local area network (LAN), a wide area network (WAN), the Internet, or any combination thereof. The PC 130 may be any computing device running an operating system and includes, for example, a laptop computer, a smart phone, a personal digital assistance (PDA), and the like. The PC's operating system may be, but is not limited to, a Windows XP®, Windows Vista®, Linux®, and the like. The PC 130 is a locked-down computer which is a computer being operated by a user account or process that does not have full administrator permissions.

In accordance with a preferred embodiment, the PC 130 runs virtual services including a least a bridge agent 135, an Encapsulator 140 and an installation monitor 145. The bridge agent 135 enables the central deployment of virtual software applications on the PC 130 without altering or making changes to the PC 130. With this aim, the bridge agent 135 retrieves, from the file server 120, files of virtual applications assigned to a user of the PC 130, and causes to the execution of these applications over the PC 130. In addition, the bridge agent 135 performs shell integration by binding the virtual applications to the operating system shell without writing or changing the registry or file system of the PC 130. The virtual applications are not installed on the PC 130, but function as if they were installed on the PC 130 and are available online and/or offline. An operating system shell provides an access to the kernel services of the operating system. The PC 130 may also run non-virtual applications with or without the control of the bridge agent 135.

The Encapsulator 140 creates, for each virtual application, an application on demand (AOD) file that includes all of the resources that a virtual application needs to run within the virtual environment. An AOD file generated by the Encapsulator 140 includes an internal virtual services manager, a digital rights management layer, a connectivity layer, and a protection layer. The protection layer seals the virtual applications from the environment of the host operating system of the PC 130 and provides the virtual applications with the required function calls and returned data and further prevents any data from being written to the host operating system. The connectivity layer enables the virtual application to communicate with other virtual applications and define the integration with the operating system shell. For example, the connectivity layer includes registry keys and files that contain shell components, such as file extensions, program file links, system tray, quick launch, and so on.

In accordance with an embodiment of the invention, a virtual application also consists of the following files: a virtual engine and a user data file. The virtual engine is an executable computing environment with its own read/write file system and registry, dynamic link library (DLL) repositories, and named objects. A user data file contains all the personalization and customization data that an application would have traditionally written into system files of the operating system. The user data file can also contain add-ons that were installed by the user while working on a virtual application, modified toolbars, preferences, temporary files, registry changes, user files (e.g., documents, music, video, etc.), and so on. User data files may be encrypted.

AOD files are maintained in a storage unit 124. The virtual engines are stored, per virtual application, in a storage unit 122, and the user data files are saved, per user and per application, in a storage unit 123. In other implementations user data files, AOD files, and virtual engine files may be stored locally on the user PC. All storage units 122, 123 and 124 may be part of the file server 120 which also includes a storage unit 126 for maintaining different versions of the bridge agents 135, each version may be per user or group of users. The file server 120 further includes a management console (MS) 125 that manages the deployment of virtual applications by performing at least: extracting the connectivity layer of each AOD file, saving this layer in a different file ("shadow file"), and obtaining virtual applications as well as settings assigned to a directory service entity in a database 150.

The installation monitor 145 is a virtual service that detects the launch and termination of application installation files. Upon detection of an installation attempt, the installation monitor 145 launches the Encapsulator 140 in order to generate a virtual application that functions as the application that the user attempts to install. For example, if the user of the PC 130 tries to install Adobe Acrobat®, then the Encapsulator 140 will virtualize this application by, for example, creating AOD and user files of the corresponding virtual application. It should be noted that the Encapsulator 140 is being executed in a virtual environment, thus no files are written to the PC's 130 operating system and the registry file during the creation of the virtual application. It should be further noted that the installation process in the virtual environment is completely transparent to the end user. That is, for the user the process being performed looks like a standard installation process.

As will be described in detail below, the installation monitor 145 may detect manual (e.g., a user activates an installation wizard) or automatic (e.g., a run of an installation file downloaded from the Internet) installation attempts using a set of rules. It should be noted that each of the virtual services including the installation monitor 145, bridge agent 135 and Encapsulator 140 is a virtual application by itself and is not installed on a host operating system of the PC 130. In some implementations the installation of software applications on locked down computers can be performed by only using the installation monitor 145 and the Encapsulator 140, and executing the virtual application using the bridge agent 135, therefore in such implementation the file server 120 is optional.

Figure 2:
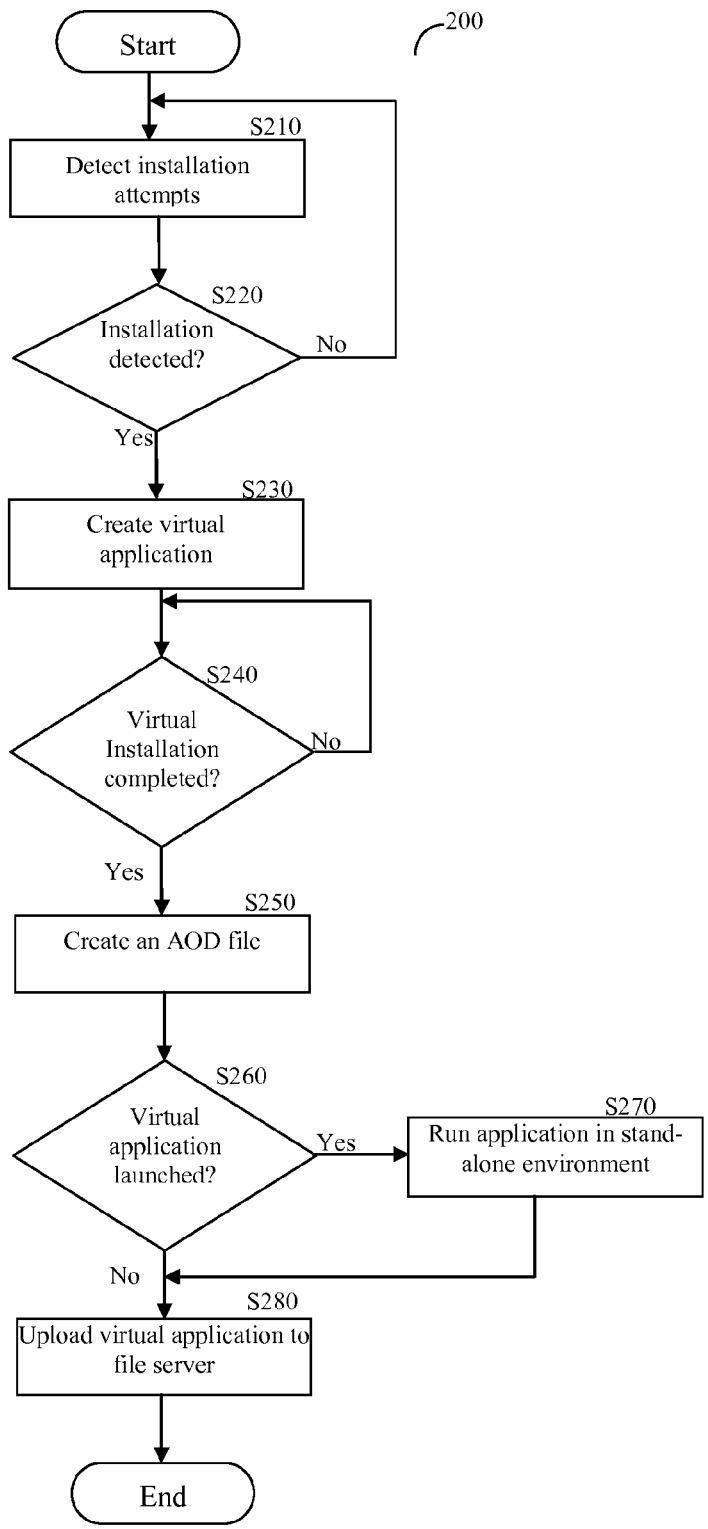
FIG. 2 is a flowchart describing a method for installing software applications on locked-down computers implemented in accordance with an embodiment of the invention.

FIG. 2 shows a non-limiting and exemplary flowchart 200 describing the method for enabling installation of software applications on locked-down computers implemented in accordance with an embodiment of the invention. The process is controlled and managed by the installation monitor 145. At S210, the installation monitor 145 tries to detect any launch of an installation program using a set of rules. In one embodiment, for any launch of an executable or installer file (e.g., MSI file), the installation monitor 145 determines if it is an installation or a launch of a regular application, for example, by checking if the file is marked as installation file. In another embodiment, an installation attempt can be detected using the location from of the launched file, and comparing this location to a dynamic white/black application executable list. For example, if the file is launched from Start→Program Files, it is a regular applications launch. If the file launched from a temporary (temp) directory, it is an installation file downloaded from a web site. Other embodiments for detecting installation attempts will be apparent to one of ordinary skill in the art.

At S220, it is checked if an installation attempt was detected, and if so, at S230 the Encapsulator 140 is activated to create a virtual application corresponding to the application that the user tried to install; otherwise, execution returns to S210. In order to generate a virtual application the Encapsulator 140 creates a new data file, launches an installation process of the software application to be virtualized in the virtual environment and during the installation process, the Encapsulator 140 captures data writes to a file system of the PC's 130 operating system and saves the data writes to the new data file. As mentioned above, while the Encapsulator 140 generates the virtual application, for the user it looks like a standard installation process. It should be noted that the Encapsulator 140 is executed in the virtual environment over an operating system which may be any of the operating system types mentioned above. Therefore, no files are written to the operating system and/or registry of the PC 130 during the installation.

The installation process performed during the creation of the virtual application is monitored by the installation monitor 145 which further checks, at S240, if the virtual installation (i.e., the process carried by the Encapsulator 140) ended, and if so execution continues with S250; otherwise, execution waits at S240. At S250 an AOD file is created by disabling all write permissions to the new data file and saving the user file as an AOD file.

At S260 it is determined as whether there is an attempt to launch the application immediately after the virtual application was created, and if so, at S270, the newly created virtual application is launched from a temporary directory. In this embodiment the process performed by the Encapsulator 140 is closed and the virtual application is launched in a different and stand alone virtual environment as any other virtual application that was deployed to the user. Thereafter, at S280, the virtual application is uploaded to the file server 120. Step S280 is optional and includes creating a user data file and a shadow file, uploading the shadow, user data, and AOD files, and deleting these files from the virtual environment of the PC 130. Uploading of virtual applications created over the PC 130 to the file server 120 ensures that a system administrator will have full control over newly created virtual applications. Once uploaded, a system administrator may launch the management console 125 which determines what action should be taken with regard to the created virtual application. For example, this application can be shared and deployed to other users, left only with the original user, or deleted from the file server 120. Once the virtual application was uploaded to the file server 120, the application can be centrally deployed and managed as described, for example, in U.S. patent application Ser. No. 12/419,165 assigned to the common assigned and incorporated herein by reference merely for the useful information that it contains.

It should be appreciated that the ability to virtualize applications on the users' PCs, enables users to run the applications as if they were installed on their PCs, thereby providing users with full functionality and complete autonomy. It should be further appreciated that an application virtualized using the process described above may include any computer program comprising executable code, such a software application, an add-on, an application update, application customizations, and so on.

The foregoing detailed description has set forth a few of the many forms that the invention can take. It is intended that the foregoing detailed description be understood as an illustration of selected forms that the invention can take and not as a limitation to the definition of the invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method for enhancing functionality of locked-down computers by allowing installation of software applications on the locked-down computers operated by users having limited administrator permissions, comprising:

detecting an attempt for installation of a software application on a locked-down computer by determining for each launch of any one of an executable file and an installer file if each of the executable file and the installer file is an installation process, wherein the determination is based on at least one of: a type of the executable file or the installer file and a location of the executable file or the installer file;

generating, in response to the detection of the attempt for installation, a virtual software application corresponding to the software application requested to be installed, wherein the virtual software application is generated in a virtual environment, wherein the virtual software application corresponding to the software application requested to be installed is generated by:

launching in a virtual environment an installation process of the software application requested to be installed, capturing data writes to a file system of an operating system of the locked-down computer, during the installation process; and upon completion of the installation process, generating an on-demand data (AOD) file to include at least the captured data writes; and enabling the execution of the virtual software application in the virtual environment.

2. The method of claim 1, wherein generating the virtual software application further comprising:
creating a new data file; and
saving the data writes captured during the installation process in the new data file.

3. The method of claim 2, further comprising:
upon completion of the installation process, generating the on-demand data (AOD) file using the new data file; and
generating a user data file.

4. The method of claim 1, wherein the installation process executed in the virtual environment is transparent to a user of the locked down computer.

5. The method of claim 4, wherein enabling the execution of the virtual software application in the virtual environment, further comprising;
when a user selects to run the software application immediately after the installation process is completed performing:
running the virtual software application from a temporary directory; and
uploading the virtual application to a file server.

6. The method of claim 5, wherein uploading the virtual application to the file server further comprising:
sharing the virtual application with other users in a organization by deploying the virtual application to computers of other users.

7. The method of claim 1, wherein the virtual application is created by an Encapsulator; and the installation process and installation attempts are monitored by a monitor.

8. The method of claim 1, wherein the locked down computer is at least a personal computer, a laptop computer, a smart phone, and a personal digital assistant (PDA).

9. A system for enhancing functionality of locked-down computers by allowing installation of software applications on the locked-down computers operated by users having limited administrator permissions, comprising:
a monitor for at least detecting an attempt for installation of a software application on a locked-down computer by determining for each launch of any one of an executable file and an installer file if each of the executable file and the installer file is an installation process, wherein the determination is based on at least one of: a type of the executable file or the installer file and a location of the executable file or the installer file;
an Encapsulator for generating, in response to the detection of the attempt for installation, a virtual software application corresponding to the software application requested to be installed, wherein the virtual software application is generated in a virtual environment, wherein the Encapsulator is further configured to:
launch in a virtual environment an installation process of the software application requested to be installed,
capture data writes to a file system of an operating system of the locked-down computer, during the installation process, and
upon completion of the installation process, generate an on-demand data (AOD) file to include at least the captured data writes; and
a bridge agent for enabling the execution of the virtual software application in the virtual environment.

10. The system of claim 9, wherein the Encapsulator is further configured to
create a new data file; and
save the data writes captured during the installation process in the new data file.

11. The system of claim 10, the Encapsulator is further configured to:
upon completion of the installation process, generate the on-demand data (AOD) file using the new data file; and
generate a user data file.

12. The system of claim 9, wherein the installation process executed in the virtual environment is transparent to a user of the locked down computer.

13. The system of claim 12, wherein enabling the execution of the virtual software application in the virtual environment, further comprising;
when a user selects to run the software application immediately after the installation process is completed performing:
running the virtual software application from a temporary directory; and
uploading the virtual application to a file server.

14. The system of claim of claim 13, wherein uploading the virtual application to the file server further comprising:
sharing the virtual application with other users in a organization by deploying the virtual application to computers of other users.

15. The system of claim 9, wherein the locked down computer is at least a personal computer, a laptop computer, a smart phone, and a personal digital assistant (PDA).

16. A non-transitory computer readable medium having stored thereon computer executable code that when executed causing a processor to perform the process allowing installation of software applications on the locked-down computers operated by users having limited administrator permissions, the process comprising:
detecting an attempt for installation of a software application on a locked-down computer by determining for each launch of any one of an executable file and an installer file if each of the executable file and the installer file is an installation process, wherein the determination is based on at least one of: a type of the executable file or the installer file and a location of the executable file or the installer file;
generating, in response to the detection of the attempt for installation, a virtual software application corresponding to the software application requested to be installed, wherein the virtual software application is generated in a virtual environment, wherein the virtual software application corresponding to the software application requested to be installed is generated by:
launching in a virtual environment an installation process of the software application requested to be installed,
capturing data writes to a file system of an operating system of the locked-down computer, during the installation process; and
upon completion of the installation process, generating an on-demand data (AOD) file to include at least the captured data writes; and
enabling the execution of the virtual software application in the virtual environment.

* * * * *